United States Patent
Thermos et al.

(10) Patent No.: US 6,352,362 B2
(45) Date of Patent: *Mar. 5, 2002

(54) METHOD OF PREVENTING LEAKAGE OF A FLUID ALONG AND THROUGH AN INSULATING JACKET OF A THERMOCOUPLE

(75) Inventors: Anthony Constantine Thermos, Greer; Fadi Elias Rahal, Easley, both of SC (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,619

(22) Filed: Sep. 14, 1999

(51) Int. Cl.$^7$ ............................ G01K 1/08; G01K 7/02; H01L 35/28; F16I 15/00
(52) U.S. Cl. ....................... 374/179; 374/208; 136/226; 277/933; 277/314; 277/316
(58) Field of Search ................................. 374/208, 179, 374/135, 183, 163, 140; 136/226, 230, 232, 234; 174/23 R; 266/87, 88; 277/931, 933, 930, 312, 314, 316

(56) References Cited

U.S. PATENT DOCUMENTS

| 3,553,827 A | * | 1/1971 | Baker et al. |
| 4,209,079 A | | 6/1980 | Marchal et al. ............... 189/6.1 |
| 4,485,263 A | * | 11/1984 | Itoyama et al. ............. 136/230 |
| 4,647,716 A | | 3/1987 | Akiyama et al. .......... 174/77 R |
| 5,270,487 A | | 12/1993 | Sawamura ................ 174/31 R |
| 5,348,395 A | * | 9/1994 | Corr, II et al. ............... 374/135 |
| 6,102,565 A | * | 8/2000 | Kita et al. ................... 374/179 |
| 6,234,488 B1 | * | 5/2001 | Martin et al. ................ 277/315 |

FOREIGN PATENT DOCUMENTS

| DE | 40 02 094 A1 | 8/1991 |
| EP | 0 913 882 A2 | 5/1999 |

OTHER PUBLICATIONS

"39th GE Turbine State–of–the–Art Technology Seminar", Tab 1, ""F" Technology—the First Half–Million Operating Hours", H.E. Miller, Aug, 1996.

"39th GE Turbine State–of–the–Art Technology Seminar", Tab 3, "GE Heavy–Duty Gas Turbine Performance Characteristics", F. J. Brooks, Aug., 1996.

"39th GE Turbine State–of–the–Art Technology Seminar", Tab 3, "9EC 50Hz 170–MW Class Gas Turbine", A. S. Arrao, Aug., 1996.

"39th GE Turbine State–of–the–Art Technology Seminar", Tab 4, "MWS6001FA—An Advanced–Technology 70–MW Class 50/60 Hz Gas Turbine", Ramachandran et al., Aug., 1996.

(List continued on next page.)

*Primary Examiner*—Diego Gutierrez
*Assistant Examiner*—Gail Verbitsky
(74) *Attorney, Agent, or Firm*—Nixon & Vanderhye P.C.

(57) ABSTRACT

A thermocouple assembly includes a thermocouple; a plurality of lead wires extending from the thermocouple; an insulating jacket extending along and enclosing the plurality of leads; and at least one internally sealed area within the insulating jacket to prevent fluid leakage along and within the insulating jacket. The invention also provides a method of preventing leakage of a fluid along and through an insulating jacket of a thermocouple including the steps of a) attaching a plurality of lead wires to a thermocouple; b) adding a heat sensitive pseudo-wire to extend along the plurality of lead wires; c) enclosing the lead wires and pseudo-wire inside an insulating jacket; d) locally heating axially spaced portions of the insulating jacket to a temperature which melts the pseudo-wire and fuses it with an interior surface of the jacket.

5 Claims, 2 Drawing Sheets

OTHER PUBLICATIONS

"39th GE Turbine State–of–the–Art Technology Seminar", Tab 5, "Turbomachinery Technology Advances at Nuovo Pignone", Benvenuti et al., Aug., 1996.
"39th GE Turbine State–of–the Art Technology Seminar", Tab 6, "GE Aeroderivative Gas Turbines—Design and Operating Features", M.W. Horner, Aug., 1996.
"39th GE Turbine State–of–the–Art Technology Seminar", Tab 7, "Advance Gas Turbine Materials and Coatings", P.W. Schilke, Aug., 1996.
"39th GE Turbine State–of–the–Art Technology Seminar", Tab 8, "Dry Low $NO_x$ Combustion Systems for GE Heavy–Duty Turbines", L. B. Davis, Aug., 1996.
"39th GE Turbine State–of–the–Art Technology Seminar", Tab 9, "GE Gas Turbine Combustion Flexibility", M. A. Davi, Aug., 1996.
"39th GE Turbine State–of–the–Art Technology Seminar", Tab 10, "Gas Fuel Clean–Up System Design Considerations for GE Heavy–Duty Gas Turbines", C. Wilkes, Aug., 1996.
"39th GE Turbine State–of–the–Art Technology Seminar", Tab 11, "Integrated Control Systems for Advanced Combined Cycles", Chu et al., Aug., 1996.
"39th GE Turbine State–of–the–Art Technology Seminar", "Power Systems for the 21st Century "H" Gas Turbine Combined Cycles", Paul et al., Aug., 1996.
"39th GE Turbine State–of–the–Art Technology Seminar", Tab 13, "Clean Coal and Heavy Oil Technologies for Gas Turbines", D. M. Todd., Aug., 1996.
"39th GE Turbine State–of–the–Art Technology Seminar", Tab 14, "Gas Turbine Conversions, Modifications and Uprates Technology", Stuck et al., Aug. 1996.
"39th GE Turbine State–of–the–Art Technology Seminar", Tab 15, "Performance and Reliability Improvements for Heavy–Duty Gas Turbines," J. R. Johnston, Aug., 1996.
"39th GE Turbine State–of–the–Art Technology Seminar", Tab 16, "Gas Turbine Repair Technology", Crimi et al, Aug., 1996.
"39th GE Turbine State–of–the–Art Technology Seminar", Tab 17, "Heavy Duty Turbine Operating & Maintenance Considerations", R. F. Hoeft, Aug. 1996.
"39th GE Turbine State–of–the–Art Technology Seminar", Tab 18, "Gas Turbine Performance Monitoring and Testing", Schmitt et al., Aug., 1996.
"39th GE Turbine State–of–the–Art Technology Seminar", "Monitoring Service Delivery System and Diagnostics", Madej et al., Aug., 1996.
"39th GE Turbine State–of–the–Art Technology Seminar", Tab 20, "Steam Turbines for Large Power Applications", Reinker et al., Aug., 1996.
"39th GE Turbine State–of–the–Art Technology Seminar", Tab 21, "Steam Turbines for Ultrasupercritical Power Plants", Retzlaff et al., Aug., 1996.
"39th GE Turbine State–of–the–Art Technology Seminar", Tab 22, "Steam Turbine Sustained Efficiency", P. Schofield, Aug., 1996.
"39th GE Turbine State–of–the–Art Technology Seminar", Tab 23, "Recent Advances in Steam Turbines for Industrial and Cogeneration Applications", Leger et al., Aug., 1996.
"39th GE Turbine State–of–the–Art Technology Seminar", Tab 24, "Mechanical Drive Steam Turbines", D. R. Leger, Aug., 1996.
"39th GE Turbine State–of–the–Art Technology Seminar", Tab 25, "Steam Turbines for STAG™ Combined–Cycle Power Systems", M. Boss, Aug., 1996.
"39th GE Turbine State–of–the–Art Technology Seminar", Tab 26, "Cogeneration Application Considerations", Fisk et al., Aug., 1996.
"39th GE Turbine State–of–the–Art Technology Seminar", Tab 27, "Performance and Economic Considerations of Repowering Steam Power Plants", Stoll et al., Aug., 1996.
"39th GE Turbine State–of–the–Art Technology Seminar", Tab 28, "High–Power–Density Evolution", J. H. Moore, Aug., 1996.
"39th GE Turbine State–of–the–Art Technology Seminar", Tab 29, "Advances in Steam Path Technologies", Cofer, IV, et al., Aug., 1996.
"39th GE Turbine State–of–the–Art Technology Seminar", Tab 30, "Upgradable Opportunities for Steam Turbines", D. R. Drier, Jr., Aug., 1996.
"39th GE Turbine State–of–the–Art Technology Seminar", Tab 31, "Uprate Options for Industrial Turbines", R. C. Beck, Aug., 1996.
"39th GE Turbine State–of–the–Art Technology Seminar", Tab 32, "Thermal Performance Evaluation and Assessment of Steam Turbine Units", P. Albert, Aug., 1996.
"39th GE Turbine State–of–the–Art Technology Seminar", Tab 33, "Advances in Welding Repair Technology" J. F. Nolan, Aug., 1996.
"39th GE Turbine State–of–the–Art Technology Seminar", Tab 34, "Operation and Maintenance Strategies to Enhance Plant Profitability", MacGillivray et al., Aug., 1996.
"39th GE Turbine State–of–the–Art Technology Seminar", Tab 35, "Generator Insitu Inspections", D. Stanton, Aug., 1996.
"39th GE Turbine State–of–the–Art Technology Seminar", Tab 36, "Generator Upgrade and Rewind", Halpern et al., Aug., 1996.
"39th GE Turbine State–of–the–Art Technology Seminar", Tab 37, "GE Combined Cycle Product Line and Performance", Chase, et al., Aug., 1996.
"39th GE Turbine State–of–the–Art Technology Seminar", Tab 38, "GE Combined Cycle Experience", Maslak et al., Aug., 1996.
"39th GE Turbine State–of–the–Art Technology Seminar", Tab 39, "Single–Shaft Combined Cycle Power Generation Systems", Tomlinson et al., Aug., 1996.
"Advanced Turbine System Program—Conceptual Design and Product Development", Annual Report, Sep. 1, 1994–Aug. 31, 1995.
"Advanced Turbine Systems (ATS Program) Conceptual Design and Product Development", Final Technical Progress Report, Vol. 2—Industrial Machine, Mar. 31, 1997, Morgantown, WV.
"Advanced Turbine Systems (ATS Program), Conceptual Design and Product Development", Final Technical Progress Report, Aug. 31, 1996, Morgantown, WV.
"Advanced Turbine Systems (ATS) Program, Phase 2, Conceptual Design and Product Development", Yearly Technical Progress Report, Reporting Period: Aug. 25, 1993–Aug. 31, 1994.
"Advanced Turbine Systems" Annual Program Review, Preprints, Nov. 2–4, 1998, Washington, D.C. U.S. Department of Energy, Office of Industrial Technologies Federal Energy Technology Center.
"ATS Conference" Oct. 28, 1999, Slide Presentation.
"Baglan Bay Launch Site", various articles relating to Baglan Energy Park.
"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", Chance et al., pp. 1–4.

"General Electric's DOE/ATH H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release 95–NPR16, May 16, 1995, H Technology/pp. 1–3.

"Overview of GE's Gas Turbine Combined Cycle", Jul. 1, 1995 to Dec. 31, 1997.

"Power Systems for the 21$^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3, Oct., 1995.

"Proceedings of the Advanced Turbine Systems Annual Program Review Meeting", vol. I, "H Gas Turbine Combined Cycle", J. Corman, p. 14, Oct., 1995.

"Proceedings of the Advanced Turbine Systems Annual Program Review Meeting", vol. I, "Overview of Westinghouse's Advanced Turbine Systems Program", Bannister et al., p. 22, Oct., 1995.

"Proceedings of the Advanced Turbine Systems Annual Program Review Meeting", vol. I, "Allison Engine ATS Program Technical Review", D. Mukavetz, p. 31, Oct., 1995.

"Proceedings of the Advanced Turbine Systems Annual Program Review Meeting", vol. I, "Advanced Turbine Systems Program Industrial System Concept Development", S. Gates, p. 43, Oct., 1995.

"Proceedings of the Advanced Turbine Systems Annual Program Review Meeting", vol. I, "Advanced Turbine System Program Phase 2 Cycle Selection", Latcovich, Jr., p. 64, Oct., 1995.

"Proceedings of the Advanced Turbine Systems Annual Program Review Meeting", vol. I, "General Electric ATS Program Technical Review Phase 2 Activities", Chance et al., p. 70, Oct., 1995.

"Proceedings of the Advanced Turbine Systems Annual Program Review Meeting", vol. I, "Technical Review of Westinghouse's Advanced Turbine Systems Program", Diakunchak et al., p. 75, Oct., 1995.

"Proceedings of the Advanced Turbine Systems Annual Program Review Meeting", vol. I, "Advanced Combustion Turbines and Cycles: An EPRI Perspective", Touchton et al., p. 87, Oct., 1995.

"Proceedings of the Advanced Turbine Systems Annual Program Review Meeting", vol. I, "Advanced Turbine Systems Annual Program Review", William E. Koop, p. 89, Oct., 1995.

"Proceedings of the Advanced Turbine Systems Annual Program Review Meeting", vol. I, "The AGTSR Consortium: An Update", Fant et al., p. 93, Oct., 1995.

"Proceedings of the Advanced Turbine Systems Annual Program Review Meeting", vol. I, "Overview of Allison/AGTSR Interactions", Sy A. Ali, p. 103, Oct., 1995.

"Proceedings of the Advanced Turbine Systems Annual Program Review Meeting", vol. I, "Design Factors for Stable Lean Premix Combustion", Richards et al., p. 107, Oct., 1995.

"Proceedings of the Advanced Turbine Systems Annual Program Review Meeting", vol. I, "Ceramic Stationary as Turbine", M. van Roode, p. 115, Oct., 1995.

"Proceedings of the Advanced Turbine Systems Annual Program Review Meeting", vol. I, "DOE/Allison Ceramic Vane Effort", Wenglarz et al., p. 148, Oct., 1995.

"Proceedings of the Advanced Turbine Systems Annual Program Review Meeting", vol. I, "Materials/Manufacturing Element of the Advanced Turbine Systems Program", Karnitz et al., p. 152, Oct. '95.

"Proceedings of the Advanced Turbine Systems Annual Program Review Meeting", vol. I, "Land–Based Turbine Casting Initiative", Mueller et al., p. 161, Oct., 1995.

"Proceedings of the Advanced Turbine Systems Annual Program Review Meeting", vol. I, "Pratt & Whitney Thermal Barrier Coatings", Bornstein et al., p. 182, Oct., 1995.

"Proceedings of the Advanced Turbine Systems Annual Program Review Meeting", vol. I, "Westinhouse Thermal Barrier Coatings", Goedjen et al., p. 194, Oct., 1995.

"Proceedings of the Advanced Turbine Systems Annual Program Review Meeting", vol. I, "High Performance Steam Development", Duffy et al., p. 200, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221, Oct. '95.

"Proceedings of the Advanced Turbine Systems Annual Program Review Meeting", vol. II, Raleigh/Raman/LIF Measurements in a Turbulent Lean Premixed Combustor, Nandula et al. p. 233, Oct. '95.

"Proceedings of the Advanced Turbine Systems Annual Program Review Meeting", vol. II, "Lean Premixed Flames for Low $No_x$ Combustors", Sojka et al., p. 249, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276, Oct. 1995.

"Proceedings of the Advanced Turbine Systems Annual Program Review Meeting", vol. II, "Advanced Turbine Cooling, Heat Transfer, and Aerodynamic Studies", Han et al., p. 281, Oct., 1995.

"Proceedings of the Advanced Turbine Systems Annual Program Review Meeting", vol. II, "Life Prediction of Advanced Materials for Gas Turbine Application", Zamrik et al., p. 310, Oct., 1995.

"Proceedings of the Advanced Turbine Systems Annual Program Review Meeting", vol. II, "Advanced Combustion Technologies for Gas Turbine Power Plants", Vandsburger et al., p. 328, Oct., 1995.

"Proceedings of the Advanced Turbine Systems Annual Program Review Meeting", vol. II, "Combustion Modeling in Advanced Gas Turbine Systems", Smoot et al., p. 353, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371, Oct., 1995.

"Proceedings of the Advanced Turbine Systems Annual Program Review Meeting", vol. II, "Rotational Effects on Turbine Blade Cooling", Govatzidakia et al., p. 391, Oct., 1995.

"Proceedings of the Advanced Turbine Systems Annual Program Review Meeting", vol. II, "Manifold Methods for Methane Combustion", Yang et al., p. 393, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410, Oct. 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415, Oct., 1995.

"Proceedings of the Advanced Turbine Systems Annual Program Review Meeting", vol. II, "Experimental and Computational Studies of Film Cooling With Compound Angle Injection", Goldstein et al., p. 423, Oct. 1995.

"Proceedings of the Advanced Turbine Systems Annual Program Review Meeting", vol. II, "Compatibility of Gas Turbine Materials with Steam Cooling", Desai et al., p. 452, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465, Oct., 1995.

"Proceedings of the Advanced Turbine Systems Annual Program Review Meeting", vol. II, Effects of Geometry on Slot–Jet Film Cooling Performance, Hyams et al., p. 474, Oct., 1995.

"Proceedings of the Advanced Turbine Systems Annual Program Review Meeting", vol. II, "Steam as Turbine Blade Coolant: Experimental Data Generation", Wilmsen et al., p. 497, Oct., 1995.

"Proceedings of the Advanced Turbine Systems Annual Program Review Meeting", vol. II, "Combustion Chemical Vapor Deposited Coatings for Thermal Barrier Coatings Systems", Hampikian et al., p. 506, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516, Oct., 1995.

"Proceedings of the Advanced Turbine Systems Annual Program Review Meeting", vol. II, "Intercooler Flow Path for Gas Turbines: CFD Design and Experiments", Agrawal et al., p. 529, Oct., 1995.

"Proceedings of the Advanced Turbine Systems Annual Program Review Meeting", vol. II, "Bond Strength and Stress Measurements in Thermal Barrier Coatings", Gell et al., p. 539, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550, Oct., 1995.

"Proceedings of the Advanced Turbine Systems Annual Program Review Meeting", vol. II, "Combustion Instability Modeling and Analysis", Santoro et al., p. 552, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560, Oct. 1995.

"Proceedings of the Advanced Turbine Systems Annual Program Review Meeting", vol. II, "Heat Pipe Turbine Vane Cooling", Langston et al., p. 566, Oct., 1995.

"Proceedings of the Advanced Turbine Systems Annual Program Review Meeting", vol. II, "Improved Modeling Techniques for Turbomachinery Flow Fields", Lakshminarayana et al., p. 573, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting","ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3, Nov., 1996.

"Proceedings of the Advanced Turbine Systems Annual Program Review Meeting", "Power Needs in the Chemical Industry", Keith Davidson, p. 17, Nov., 1996.

"Proceedings of the Advanced Turbine Systems Annual Program Review Meeting", "Advanced Turbine Systems Program Overview", David Esbeck, p. 27, Nov., 1996.

"Proceedings of the Advanced Turbine Systems Annual Program Review Meeting", "Westinghouse's Advanced Turbine Systems Program", Gerard McQuiggan, p. 35, Nov., 1996.

"Proceedings of the Advanced Turbine Systems Annual Program Review Meeting", "Overview of GE's H Gas Turbine Combined Cycle", Cook et al., p. 49, Nov., 1996.

"Proceedings of the Advanced Turbine Systems Annual Program Review Meeting", "Allison Advanced Simple Cycle Gas Turbine System", William D. Weisbrod, p. 73, Nov., 1996.

"Proceedings of the Advanced Turbine Systems Annual Program Review Meeting", "The AGTSR Industry–University Consortium", Lawrence P. Golan, p. 95, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, p. 111, Nov., 1996.

"Proceedings of the Advanced Turbine Systems Annual Program Review Meeting", "Methodologies for Active Mixing and Combustion Control", Uri Vandsburger, p. 123, Nov., 1996.

"Proceedings of the Advanced Turbine Systems Annual Program Review Meeting", "Combustion Modeling in Advanced Gas Turbine Systems", Paul O. Hedman, p. 157, Nov., 1996.

"Proceedings of the Advanced Turbine Systems Annual Program Review Meeting", "Manifold Methods for Methane Combustion", Stephen B. Pope, p. 181, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189, Nov. 1996.

"Proceedings of the Advanced Turbine Systems Annual Program Review Meeting", "Effect of Swirl and Momentum Distribution on Temperature Distribution in Premixed Flames", Ashwani K. Gupta, p. 211, Nov. 1996.

"Proceedings of the Advanced Turbine Systems Annual Program Review Meeting", "Combustion Instability Studies Application to Land–Based Gas Turbine Combustors", Robert J. Santoro, p. 233, Nov., 1996.

"Proceedings of the Advanced Turbine Systems Annual Program Review Meeting", Active Control of Combustion Instabilities in Low $NO_x$ Turbines, Ben T. Zinn, p. 253, Nov., 1996.

"Proceedings of the Advanced Turbine Systems Annual Program Review Meeting", "Life Prediction of Advanced Materials for Gas Turbine Application," Sam Y. Zamrik, p. 265, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275, Nov., 1996.

"Proceedings of the Advanced Turbine Systems Annual Program Review Meeting", "Compatibility of Gas Turbine Materials with Steam Cooling", Vimal Desai, p. 291, Nov., 1996.

"Proceedings of the Advanced Turbine Systems Annual Program Review Meeting", "Bond Strength and Stress Measurements in Thermal Barrier Coatings", Maurice Gell, p. 315, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335, Nov. 1996.

"Proceedings of the Advanced Turbine Systems Annual Program Review Meeting", "Flow Characteristics of an Intercooler System for Power Generating Gas Turbines", Ajay K. Agrawal, p. 357, Nov., 1996.

"Proceedings of the Advanced Turbine Systems Annual Program Review Meeting", "Improved Modeling Techniques for Turbomachinery Flow Fields", B. Lakshiminaryayana, p. 371, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393, Nov., 1996.

"Proceedings of the Advanced Turbine Systems Annual Program Review Meeting", "Advanced Turbine Cooling, Heat Transfer, and Aerodynamic Studies", Je–Chin Han, p. 407, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427, Nov. 1996.

"Proceedings of the Advanced Turbine Systems Annual Program Review Meeting", Experimental and Computational Studies of Film Cooling with Compound Angle Injection, R. Goldstein, p. 447, Nov. 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461, Nov., 1996.

"Proceedings of the Advanced Turbine Systems Annual Program Review Meeting", "Steam as a Turbine Blade Coolant; External Side Heat Transfer", Abraham Engeda, p. 471, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483, Nov. 1996.

"Proceedings of the Advanced Turbine Systems Annual Program Review Meeting", "Closed–Loop Mist–Steam Cooling for Advanced Turbine Systems", Ting Wang, p. 499, Nov., 1996.

"Proceedings of the Advanced Turbine Systems Annual Program Review Meeting", "Heat Pipe Turbine Vane Cooling", Langston et al., p. 513, Nov., 1996.*

"Proceedings of the Advanced Turbine Systems Annual Program Review Meeting", "EPRI's Combustion Turbine Program: Status and Future Directions", Arthur Cohn, ,p. 535, Nov., 1996.*

"Proceedings of the Advanced Turbine Systems Annual Program Review Meeting", "ATS Materials Support", Michael Karnitz, p. 553, Nov., 1996.*

"Proceedings of the Advanced Turbine Systems Annual Program Review Meeting", "Land Based Turbine Casting Initiative", Boyd A. Mueller, p. 577, Nov. 1996.*

"Proceedings of the Advanced Turbine Systems Annual Program Review Meeting", "Land Based Turbine Casting Initiative", Boyd A. Mueller, p. 577, Nov. 1996.*

"Proceedings of the Advanced Turbine Systems Annual Program Review Meeting", "Hot Corrosion Testing of TBS's", Norman Bornstein, p. 623, Nov., 1996.*

"Proceedings of the Advanced Turbine Systems Annual Program Review Meeting", "Ceramic Stationary Gas Turbine", Mark van Rood, p. 633, Nov., 1996.*

"Proceedings of the Advanced Turbine Systems Annual Program Review Meeting", "Western European Status of Ceramics for Gas Turbines", Tibor Bornemisza, p. 659, Nov., 1996.*

"Proceedings of the Advanced Turbine Systems Annual Program Review Meeting", "Status of Ceramic Gas Turbines in Russia", Mark van Rood, p. 671, Nov., 1996.*

"Status Report: The U.S. Department of Energy's Advanced Turbine systems Program", facsimile dated Nov. 7, 1996.*

"Testing Program Results Validate GE's H Gas Turbine—High Efficiency, Low Cost of Electricity and Low Emissions", Roger Schonewald and Patrick Marolda, (no date available).*

"Testing Program Results Validate GE's H Gas Turbine—High Efficiency, Low Cost of Electricity and Low Emissions", Slide Presentation—working draft (no date available).*

"The Next Step In H . . . For Low Cost Per kW–Hour Power Generation", LP–1 PGE '98.*

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176—5628.*

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176—10.*

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.*

"Utility Advanced Turbine System (ATS) Technology Readiness Testing and Pre–Commercialization Demonstration—Phase 3", Document #486132, Apr. 1–Jun. 30, 1976, Publication Date, Dec. 31, 1996, Report Nos.: DOE/MC/31176—5660.*

"Utility Advanced Turbine System (ATS) Technology Readiness Testing and Pre–Commercialization Demonstration—Phase 3", Document #587906, Jul. 1–Sep. 30, 1995, Publication Date, Dec. 31, 1995, Report Nos.: DOE/MC/31176—5339.*

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.*

"Utility Advanced Turbine System (ATS) Technology Readiness Testing and Pre–Commercialization Demonstration" Jan. 1–Mar. 31, 1996, DOE/MC/31176—5338.*

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.*

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.*

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Nos.: DE–FC212–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176–18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

METHOD OF PREVENTING LEAKAGE OF A FLUID ALONG AND THROUGH AN INSULATING JACKET OF A THERMOCOUPLE

This invention was made with Government support under Contract No. DE-FC21-95MC31176 awarded by the Department of Energy. The Government has certain rights in this invention.

BACKGROUND OF THE INVENTION

This invention relates to thermocouple assemblies and particularly those that are used inside lubricated components such as turbine bearings. Specifically, the invention relates to a unique insulating jacket and thermocouple lead arrangement which prevents leakage of lubricating medium through the thermocouple jacket.

During the installation and routing of a thermocouple in, for example, a gas turbine bearing housing, the insulating jacket of the thermocouple can be cut or skinned. Any opening in the insulation jacket during installation permits lubricant such as oil within the bearing housing to leak through the outer insulating jacket and along the internal wires or leads. The oil can flow all the way to a junction box where the thermocouple leads are connected to terminal boards. The oil leakage may even be sufficient to flood the board and cause malfunction of the thermocouple readings. While this problem can be fixed easily if the opening in the insulation jacket is located outside the bearing housing, repair proves problematic in the event the cut or tear is inside the bearing housing, requiring an expensive and time consuming teardown of the bearing and attendant shut-down of the turbine.

BRIEF SUMMARY OF THE INVENTION

This invention solves the problem of internal leakage of fluid through the thermocouple insulating jacket by introducing a silicone (or other epoxy) "pseudo-wire" into the assembly process during manufacture of the thermocouple. The "pseudo-wire" (preferably silicone) extends through the insulated jacket along and among the thermocouple leads. The thermocouple is then locally heated to a temperature which melts the silicone wire inside the thermocouple jacket and fuses it to the inside wall of the jacket. These localized fused areas may be about 12 inches in length and spaced apart by intervals of about 24 inches. Each of these fused areas provides a blockage to potential oil leaks caused by a cut or tear in the outer insulating jacket of the thermocouple.

Accordingly, in its broader aspects, the present invention relates to a thermocouple assembly comprising a thermocouple; a plurality of lead wires extending from the thermocouple; an insulating jacket extending along and enclosing the plurality of leads; and at least one internally sealed area within the insulating jacket to prevent fluid leakage along and within the insulating jacket.

In another aspect, the invention relates to a machine component housing having a lubricant therein and a thermocouple assembly mounted in a wall of the housing, the thermocouple assembly comprising: a thermocouple; a plurality of lead wires extending from the thermocouple; an insulating jacket extending along and enclosing the plurality of leads; and at least one internally sealed area within the insulating jacket to prevent fluid leakage along and within the insulating jacket.

In still another aspect, the invention relates to a method of preventing leakage of a fluid along and through an insulating jacket of a thermocouple comprising the steps of: a) attaching a plurality of lead wires to a thermocouple; b) adding a heat sensitive pseudo-wire to extend along the plurality of lead wires; c) enclosing the lead wires and pseudo-wire inside an insulating jacket; d) locally heating axially spaced portions of the insulating jacket to a temperature which melts the pseudo-wire and fuses it with an interior surface of the jacket.

DETAILED DESCRIPTION OF THE INVENTION

Figure 1:
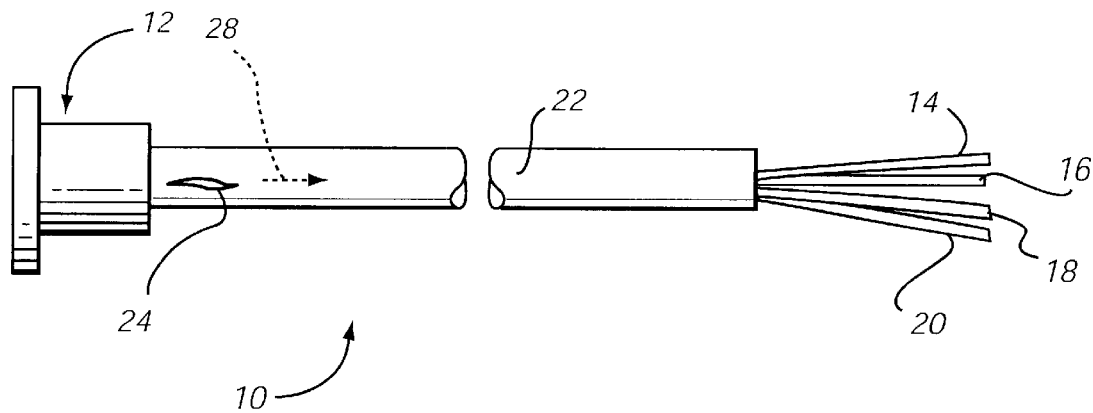
FIG. 1 is a schematic diagram of a conventional thermocouple assembly.

With reference to FIG. 1, a conventional thermocouple assembly 10 includes a thermocouple 12 along with a plurality of leads 14, 16, 18 and 20. The leads are enclosed within a flexible, extruded insulating jacket 22 which may be made of Teflon® or other suitable material.

Figure 2:
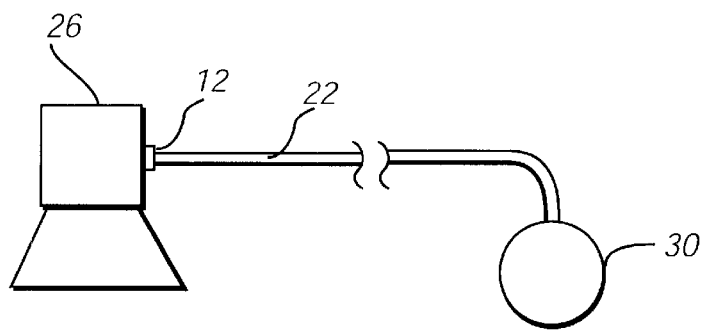
FIG. 2 is a schematic diagram of a thermocouple assembly mounted in a wall or turbine bearing housing, with the thermocouple leads extending to a terminal board.

If a cut or tear 24 is inadvertently made in the insulating jacket 22 during installation of the thermocouple at a location within, for example, a lubricated bearing housing 26 (see FIG. 2), the lubricating oil within the bearing may enter the jacket and flow in the direction of arrow 28. This oil may flow the entire length of the thermocouple leads (which may be 60 feet or more) and flood the terminal board 30, thus causing erroneous thermocouple readings, and requiring an expensive and time consuming shutdown.

Figure 3:
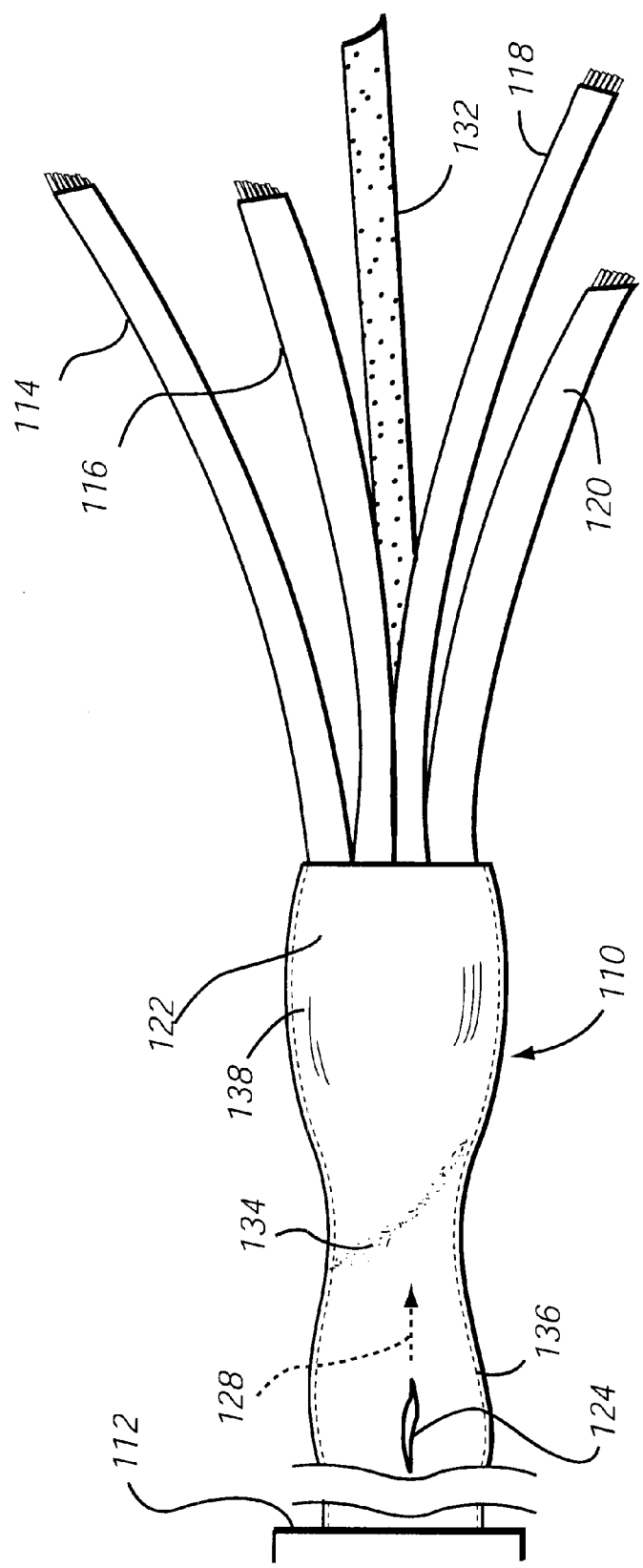
FIG. 3 is an enlarged partial elevation of a thermocouple assembly in accordance with an exemplary embodiment of the invention.

FIG. 3 illustrates an exemplary embodiment of this invention where a silicone or other suitable epoxy pseudo-wire is added to the thermocouple assembly during manufacture. For convenience, reference numerals are used in FIG. 3 which correspond to those used in FIG. 1, but with the prefix "1" added. Thus, the thermocouple assembly 110 includes a thermocouple (not shown) and a plurality of leads 114, 116, 118 and 120 enclosed within an insulating jacket 122. The silicone "pseudo-wire" 132 added during manufacture of the assembly runs along and between the thermocouple leads 114, 116, 118 and 120, for substantially the entire length of the jacket. After the introduction of the silicone wire 132, the jacket 122 is externally heated at spaced locations along its length to a temperature of about 200° F. to melt the wire 132 and fuse the melted material to the interior surface of the jacket 122. One such fused portion is shown at 134 in FIG. 3. If necessary, an etching material can be added to the Teflon® jacket material as it is extruded to thereby enhance the bond between the melted "pseudo-wire" and the jacket. The fusing process results in adjacent areas ballooning slightly outwardly as shown at 136 and 138. These localized fused areas 134 may be about 12 inches in length, and may be axially spaced by about 24 inches, but these dimensions may vary depending on the particular thermocouple application. Each fused area 134 provides an internally sealed area, blocking the potential flow of oil caused by skinning or tearing the outer insulating jacket during thermocouple installation. In other words, oil entering the jacket 122 from a tear 124 in the jacket 122 (flowing in the direction of arrow 128) will not be able to reach the terminal board 30 (FIG. 2) because of the multiple seals formed along the length of the jacket.

It will be appreciated that the thermocouple assembly design as described herein not only prohibits oil leaking between the outer insulation jacket and the internal wires from the bearing to the junction box, but also allows operators to easily strip the jacket and connect the wires to the terminal boards due to its unique "balloon" configuration, i.e., the diameters of the unsealed areas 136, 138 are greater than the diameters of the sealed areas 134.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of preventing leakage of a fluid along and through an insulating jacket of a thermocouple comprising the steps of:

a) attaching a plurality of lead wires to a thermocouple;

b) adding a heat sensitive pseudo-wire to extend along the length of the plurality of lead wires;

c) enclosing the lead wires and pseudo-wire inside an insulating jacket;

d) locally heating axially spaced portions of said insulating jacket to a temperature at which said pseudo-wire melts and fuses with an interior surface of the insulating jacket, creating internally sealed areas, thereby preventing leakage through the insulating jacket when the thermocouple is exposed to a fluid and causing said insulating jacket to balloon outwardly in areas adjacent said axially spaced portions.

2. The method of claim 1 wherein said axially spaced portions are about 24 inches apart.

3. The method of claim 1 wherein each said axially spaced portion is about 12 inches in length.

4. The method of claim 1 wherein said pseudo-wire is composed of silicone.

5. The method of claim 1 wherein said pseudo-wire is composed of epoxy.

* * * * *